United States Patent [19]

Kimura et al.

[11] Patent Number: 5,749,211
[45] Date of Patent: May 12, 1998

[54] FIBER-REINFORCED PLASTIC BAR AND PRODUCTION METHOD THEREOF

[75] Inventors: Hiromi Kimura; Kanji Yamada; Yasuhiro Hirato, all of Kawasaki, Japan

[73] Assignees: Nippon Steel Corporation; Nippon Steel Chemical Co., Ltd., both of Tokyo, Japan

[21] Appl. No.: 674,299

[22] Filed: Jul. 1, 1996

Related U.S. Application Data

[63] Continuation of Ser. No. 256,271, Jul. 5, 1994, abandoned.

[30] Foreign Application Priority Data

Nov. 6, 1992 [JP] Japan .................. 4-321382

[51] Int. Cl.$^6$ .................. D02G 3/36
[52] U.S. Cl. .................. 57/217; 264/258
[58] Field of Search .................. 52/737.1, 740.1, 52/740.2, 740.3, 740.4, 740.5, 223.4, 223.6, 223.8; 57/210, 212, 217; 428/371; 264/103, 257, 258, 342 R, DIG. 71

[56] References Cited

U.S. PATENT DOCUMENTS

| | | | |
|---|---|---|---|
| 4,741,873 | 5/1988 | Fischer et al. | 264/258 X |
| 5,182,064 | 1/1993 | Ishizuka et al. | |

FOREIGN PATENT DOCUMENTS

| | | |
|---|---|---|
| B-521454 | 4/1982 | Australia . |
| 0170499 | 2/1986 | European Pat. Off. . |
| 0199348 | 10/1986 | European Pat. Off. . |
| 0417612 | 3/1991 | European Pat. Off. . |
| 54-29376 | 3/1979 | Japan . |
| 63-51014 | 4/1988 | Japan . |
| 63-206548 | 8/1988 | Japan . |
| 63-236848 | 10/1988 | Japan . |
| 63-277350 | 11/1988 | Japan . |
| 1-192946 | 8/1989 | Japan . |
| 2-105830 | 4/1990 | Japan . |
| 2-92624 | 4/1990 | Japan . |

OTHER PUBLICATIONS

Database WPI, Week 8017, Derwent Publications Ltd., London, GB; AN 80-30531, Anonymous—RD192025, abstract.
*Plastic Handbook*, Ryosuke Murahashi, Jul. 10, 1973, Asakura Shoten (Tokyo) pp. 339–340 International Search Report PCT/JP93/01612.

*Primary Examiner*—Kien T. Nguyen
*Attorney, Agent, or Firm*—Kenyon & Kenyon

[57] ABSTRACT

A fiber-reinforced plastic bar comprises a core and a surface member, the core comprises a high strength continuous fiber and a matrix resin, and the surface member comprises a polypropylene fiber. This fiber-reinforced plastic bar does not undergo degradation even when mortar, concrete, etc. are cured in an autoclave.

2 Claims, 1 Drawing Sheet

_5,749,211_

FIBER-REINFORCED PLASTIC BAR AND PRODUCTION METHOD THEREOF

This application is a continuation, of application Ser. No. 08/256,271 filed Jul. 5, 1994 now abandoned.

TECHNICAL FIELD

This invention relates to a fiber-reinforced plastic bar used for reinforcing concrete, etc.

BACKGROUND ART

Reinforcing steel has been widely used in the past as a reinforcing bar for cement, mortar, concrete, etc. (hereinafter referred to as "concrete, etc."). Recently, various fiber-reinforced plastic (FRP) bars have been developed so as to satisfy the requirements such as light-weight, corrosion resistance, and so forth.

These bars are produced by solidifying reinforcing fibers such as a carbon fiber, an aramide fiber, a glass fiber, a vinylon fiber, etc. by a thermosetting resin such as an epoxy resin, an unsaturated polyester resin, etc, or a thermoplastic resin such as polyphenylene sulfide (PPS), as a matrix material.

To reinforce concrete, etc, by these fiber-reinforced plastic bars, bonding strength between the bars and concrete, etc, must be high.

To satisfy this requirement, it has been a customary practice to form corrugations or convexities on the bar and to improve mechanical bonding power.

As the method described above, there are a method of imparting convexities to the FRP itself, and a method of forming a surface member on the surface of the FRP and then disposing convexities.

The method of imparting convexities to the FRP itself includes a method of making a part of the FRP flat as described in Japanese Unexamined Patent Publication (Kokai) No. 63-206548, a method of forming protuberances in the FRP as described in Japanese Unexamined Patent Publication (Kokai) No. 2-92624, a method of twisting a rod having a sectional shape other than a perfect circle as described in Japanese Unexamined Patent Publication (Kokai) No. 1-192946, a method of using a braided rope as described in Japanese Unexamined Patent Publication (Kokai) No. 2-105830, and various others.

However, each of the methods described above involves the critical problems, that is, excess production steps become necessary, production becomes more difficult, and the strength of the FRP itself drops because the reinforcing fibers are not oriented in the reinforcing direction as they swell.

Accordingly, the method which applies the surface member to the FRP surface is excellent from the aspect of the strength, and as definite methods of this kind, a method of braiding organic fibers such as a polyester fiber, a vinylon fiber, an acrylic fiber, etc, onto the surface, and a method of winding an organic fiber spirally on the surface, are known.

On the other hand, concrete, etc. as cement is cured and left as such cannot be practically used. Therefore, a curing process becomes necessary.

Underwater curing, wet air curing and autoclave curing are known as the curing method.

Among them, the autoclave curing method is the one that effects heating and pressurization by a water vapor inside an autoclave, and is characterized in that the curing time can be reduced and moreover, the improvement in the strength is greater than other curing methods.

However, when concrete, etc, reinforced by the FRP bar using the organic fiber described above as the surface member is cured in the autoclave, there occurs the problem that the strength of concrete, etc, reinforced by the FRP bar is extremely lower than the strength provided by other curing methods.

This is because the organic fiber of the surface member is degraded by a high temperature alkali during the autoclave curing process because the inside of cement is under an alkaline atmosphere, and the adhesion strength between the bar and concrete, etc, lowers.

The present invention is directed to provide an FRP bar having an excellent tensile strength and excellent autoclave resistance, and a simple method of producing the FRP bar.

DISCLOSURE OF THE INVENTION

The present invention provides a fiber-reinforced plastic bar comprising a core and a surface member, wherein the core comprises a high strength continuous fiber and a matrix resin, and the surface member comprises a polypropylene fiber. The present invention provides also a concrete structure or product reinforced by this bar.

Further, the present invention provides a method of producing the fiber-reinforced plastic bar described above characterized in that after a fiber bundle of a high strength continuous fiber is impregnated with an uncured thermosetting resin, this fiber bundle or a bundle of a plurality of the fiber bundles are covered with a polypropylene fibers, and heat-treatment for curing is applied to the thermosetting resin.

BRIEF DESCRIPTION OF DRAWINGS

Hereinafter, the content of the present invention will be explained in detail with reference to the drawings.

BEST MODE FOR CARRYING OUT THE INVENTION

Figure 1:
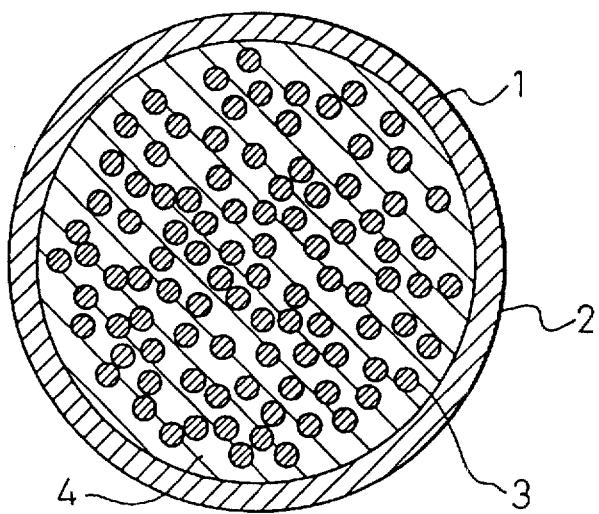
FIG. 1 is a sectional view of bar according to the present invention.
Figure 2:
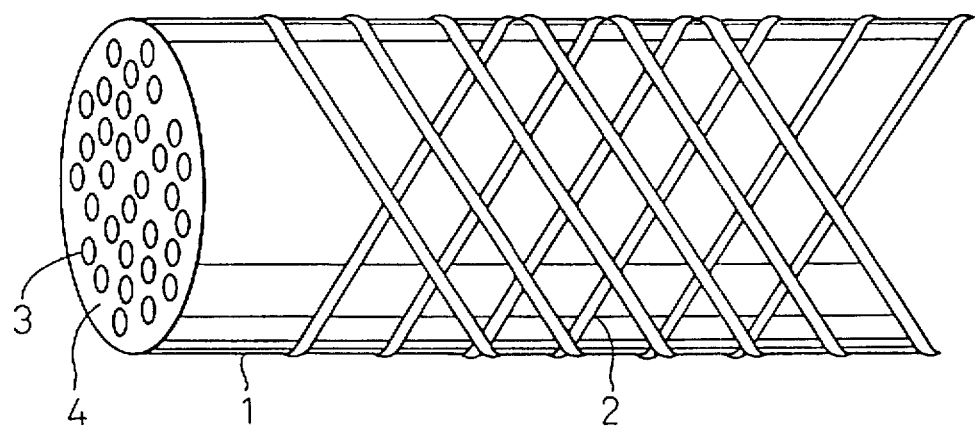
FIG. 2 is a side view of an FRP bar according to the present invention.

In FIG. 1, a core 1 is an FRP consisting of a continuous fiber 3 and a matrix 4. A surface member 2 is formed around this core 1.

The high strength continuous fiber 3 that constitutes the core 1 has a strength necessary for use as a reinforcing member of concrete, etc, and preferably has a tensile strength of at least 50 kgf/mm$^2$.

Examples of such a fiber include a carbon fiber, an aramide fiber, a glass fiber, a polyarylate fiber, a boron fiber, and so forth.

Among them, the polyarylate fiber is an aromatic polyester having a liquid crystal property, and "Vectran" (trade name) of Kuraray Co. corresponds to this type.

In this case, one or a plurality of kinds of fibers described above may be used.

Among the fibers described above, the carbon fiber is particularly preferred because it can produce a product having high heat- and alkali-resistance and high elastic modulus.

A thermosetting resin is used as the matrix 4. Examples of the thermosetting resin used for the matrix 4 include an epoxy resin, an unsaturated polyester resin, a polyimide resin, a bismaleimidetriazine resin, and so forth.

Other resins can also be used so long as they are used for the FRP. Resins having high heat- and alkali-resistance such as the epoxy resin are particularly preferred as the resins used for the matrix.

Vf (volume content ratio of fibers) of the FRP constituting the core is preferably from 40% to 75%.

In other words, if Vf is less than 40%, the FRP has low performance as the bar and if it exceeds 75%, production is difficult.

The size of the core is not particularly limited. Practically, however, a core having a diameter of 1 mm to 50 mm is used in the case of a round section, for example.

The surface member 2 is covered on the surface of the core. A polypropylene fiber is used for the surface member 2. The polypropylene fiber can be used in any form of monofilaments, multi-filaments and spun yarns.

They may be selected in consideration of the heat-treatment condition of the resin, the mechanical strength, the cost, etc.

When the spun yarn is used among them, it can be preferably used because it has high adhesion strength with concrete, etc.

Though the detailed reason is not clarified, it is believed that when the spun yarn is used, the surface property provides a favourable result for the improvement of the adhesion strength, in particular.

The polypropylene fiber used for covering preferably has a shrinkage ratio of at least 5% under the curing heat-treatment condition of the resin.

In other words, when the polypropylene fiber having a shrinkage ratio of at least 5% is used, a pressure due to heat shrinkage is applied so as to tighten the fiber bundle and at the same time, the resin oozes out on the surface, so that the surface member and the core can be integrated.

If polypropylene is used as the base, any polypropylene fiber can be used, and various modifications can be made, whenever necessary.

The size of the polypropylene fiber and its fiber diameter are not particularly limited, and they can be decided in accordance with desired surface corrugations, performance of a covering machine, and so forth.

The FRP bar according to the present invention can be produced by the following method, by way of example.

A fiber bundle consisting of at least one member selected from the group of the carbon fiber, the aramide fiber and the polyarylate fiber is impregnated with an uncured thermosetting resin, and then the polypropylene fiber is covered to this fiber bundle or to a fiber bundle bundling the fiber bundles. Thereafter, heat-treatment for curing is applied to the thermosetting resin.

The fiber bundle used hereby is obtained by bundling hundreds to dozens of thousands of the fibers (single fibers) of the same kind.

The fiber bundle can be impregnated with the resin in a customary manner. For example, the fiber bundle is continuously passed through a resin solution prepared by diluting the resin with a solvent to impregnate with the resin, and successively drying the resin to evaporate the solvent.

The fiber bundle impregnated with the resin is used as one bundle, or an assemble of a plurality of fiber bundles.

The number of fiber bundles used is determined on the basis of the sectional area of the core produced and the sectional area of the fiber bundle.

When a plurality of fiber bundles are assembled and used, the fiber bundles need not be the same kind, and different kinds of fiber bundles may be assembled and used, if necessary.

The fiber bundles can be bundled by passing them through a die or twisting them together. Further, the covering treatment can also be used as the bundling treatment.

Covering is carried out by braiding the polypropylene fiber on the surface of the core, or spirally winding them. It is also possible to wind a woven fabric.

Covering need not completely cover the core material. Though the covering layer preferably covers at least 60% of the surface of the core, an advantage can be effectively obtained in some cases even when the covering layer covers a part of the surface of the core, such as a covering ratio of 5 to 10%, for example.

The fiber bundle impregnated with the uncured thermosetting resin and covered with the polypropylene fiber is heat-treated under the heat-treatment condition of the thermosetting resin used, thereby curing the resin and obtaining the FRP bar.

This heat-treatment may be a system which continuously passes the fiber bundle through a furnace or a batch heating system which heats the fiber bundle batch-wise.

Reinforced concrete, free from the drop of reinforcing efficiency even when autoclave curing is effected to the concrete, can be obtained by using the FRP bar according to the present invention.

In order for the FRP bar to keep excellent reinforcing efficiency even after autoclave curing, the surface material must not undergo degradation due to autoclave curing. For this purpose, the surface member must have high heat- and alkali-resistance.

The carbon fiber, the aramide fiber and the polyarylate fiber are examples of the fibers having high heat- and alkali-resistance. However, these fibers are expensive, and the carbon fiber has a small elongation at break. Accordingly, handling for conducting the covering treatment is difficult.

Furthermore, since the fibers described above have low shrinkage, they do not have a pressurization effect on the fiber bundle, so that compactness of the fiber bundle and integration of the surface member with the core cannot be easily attained.

On the other hand, the polypropylene fiber has high chemical resistance and shrinkage, but has defects of a low bonding strength with mortar and resins.

This is because polypropylene does not have a polar functional group and its surface is inactive.

For this reason, though the polypropylene fiber has been used conventionally for improving toughness of concrete, etc. it has not been used for improving the strength.

However, the FRP bar according to the present invention can allow the reinforcing mechanism to effectively act even when the polypropylene fiber is used.

The reason is as follows. It is believed that adhesion between the FRP bar and concrete primarily depends on the anchor function by convexities of the bar surface, and lowness of chemical bonding strength between the surface member and concrete does not exert adverse influences so much.

The polypropylene fiber has the drawback that its heat-resistance is low. In other words, the polypropylene fiber is molten at 164° C. and undergoes shrinkage even below this temperature.

The strength of the organic fibers generally drops markedly when they undergo shrinkage. Therefore, it has been believed that these fibers cannot be used at a temperature above their shrinkage point.

In the case of the bar of the present invention, however, the drop of the bonding strength with concrete does not occur even when autoclave curing is carried out near the melting point of the polypropylene fiber.

Though the reason has not been clarified in detail, it is believed that since the polypropylene fiber is buried in the matrix resin and concrete, vigorous shrinkage is prevented, and consequently, the drop of the strength does not occur so much.

As to the form of the fiber, the highest adhesion strength can be obtained when the spun yarn is used. Though the reason has not been clarified in detail, it is believed that when the spun yarn is used, its surface property provides a favourable result for improving particularly the adhesion strength.

EXAMPLE

An adhesion strength test in this example was carried out in accordance with Japan Concrete Institute Standards (JCI-SFL8). One bar was buried in mortar of a bricket type testpiece, and after it was wet-cured for one day, it was subjected to autoclave curing at 160° C. for 10 hours to obtain a testpiece. The evaluation value was the quotient obtained by dividing the maximum load of the testpiece in the tensile test by the burying area. The value represents a mean of five tests.

The spun yarn of the polypropylene fiber used had a size of 500 Deniers and a shrinkage ratio of 10% at 140° C.

Filament yarns of the polypropylene fiber were multifilament yarns having a size of 500 Deniers and a shrinkage ratio of 15% at 140° C.

A fiber bundle obtained by bundling 3,000 carbon fibers having a tensile strength of 350 kgf/mm$^2$ and a tensile elastic modulus of 35 tonf/mm$^2$ was impregnated with an epoxy resin, which was dissolved in methyl ethyl ketone and was of a type which was cured at 140° C. in one hour. The fiber bundle was continuously heated in a heating furnace at 80° C. with a retention time of 20 minutes so as to distill off the solvent, i.e. methyl ethyl ketone.

After 20 epoxy resin-impregnated fiber bundles were gathered, the polypropylene fiber was covered on the resulting fiber bundle under the condition tabulated in Table 1. Further, the fiber bundle was continuously heated in a heating furnace at 140° C. for one hour so as to cure the epoxy resin and to obtain an FRP bar.

In each of the resulting bars, the resin permeated satisfactorily into the polypropylene fibers and was integrated with the core.

Table 1 illustrates the kind of the polypropylene fibers used, the coating condition, the covering ratio and the adhesion strength test results.

TABLE 1

| Example | kind of polypropylene fiber | covering condition | covering ratio | diameter of core (mm) | diameter of bar (mm) | adhesion strength (kgf/cm$^2$) |
|---|---|---|---|---|---|---|
| 1 | spun yarn | braid | 80% | 3.1 | 3.3 | 100 |
| 2 | spun yarn | spiral | 80% | 3.1 | 3.3 | 80 |
| 3 | filament yarn | braid | 80% | 3.0 | 3.0 | 70 |
| 4 | spun yarn | braid | 20% | 3.2 | 3.4 | 70 |

COMPARATIVE EXAMPLE 1

As a Comparative Example, multi-filaments of a polyester fiber having a size of 500 Deniers were braided at a covering ratio of 100% in place of the polypropylene fiber.

In the resulting bar, the resin well permeated into the polyester fiber and was integrated with the core.

The adhesion strength measured by the same method as that of Example was 10 kgf/cm$^2$, and the polyester fiber was degraded into brown color due to curing.

COMPARATIVE EXAMPLE 2

As another Comparative Example, multifilaments of an aramide fiber having a size of 500 Deniers were braided at a covering ratio of 80% in place of the polypropylene fiber.

In the resulting bar, the resin hardly permeated into the aramide fiber, and the core and the aramide fiber were hardly bonded.

The adhesion strength measured in the same way as in Example was 10 kgf/cm$^2$.

INDUSTRIAL APPLICABILITY

Mortar, concrete, etc. reinforced by the FRP bar which have excellent characteristics and can be cured in an autoclave can be obtained by using the bar of the present invention. Therefore, the present invention is useful in the fields of construction and civil engineering.

We claim:

1. A method for producing a fiber-reinforced plastic bar comprising:

providing a fiber bundle comprising high strength continuous fiber;

impregnating said fiber bundle with uncured thermosetting resin;

forming a core member having a core surface from at least one fiber bundle;

providing a spun yarn spun from polypropylene fiber having a shrinkage ratio of at least 5% under curing heat-treatment conditions of the resin;

braiding said spun polypropylene fiber yarn on said core surface in a manner such that said spun polypropylene yarn covers at least 60% of said core surface;

heat treating said braided core to cure said thermosetting resin; and shrinking said polypropylene fiber at least 5% during the curing heat-treatment.

2. A method according to claim 1 comprising:

forming said core member having said core surface from a plurality of said fiber bundles.

* * * * *